Figure 1:
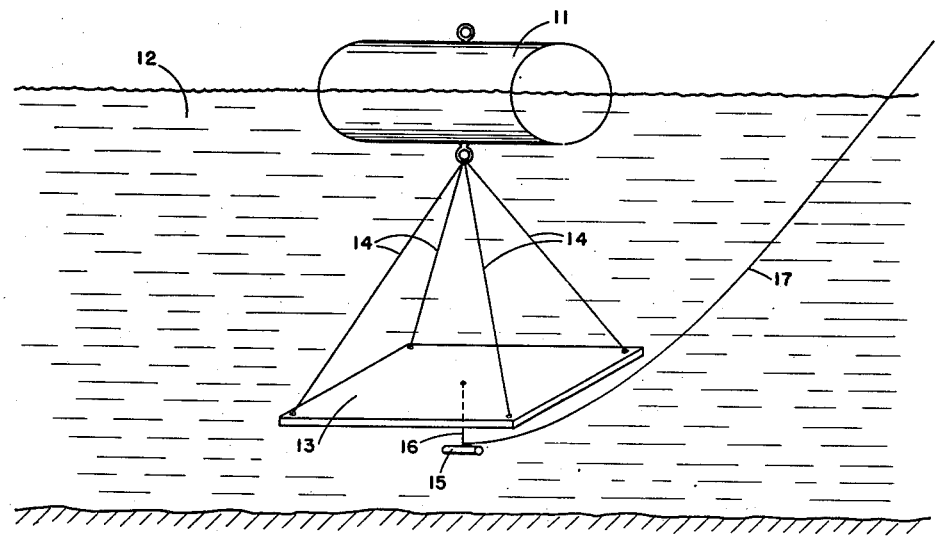

July 29, 1952  R. W. MANN  2,604,954
SEISMIC EXPLORATION METHOD
Filed Jan. 24, 1948

Ralph W. Mann, INVENTOR.
BY Dwight C. Otis
AGENT.

Patented July 29, 1952

2,604,954

UNITED STATES PATENT OFFICE 2,604,954

SEISMIC EXPLORATION METHOD

Ralph W. Mann, Houston, Tex., assignor, by mesne assignments, to Standard Oil Development Company, Elizabeth, N. J., a corporation of Delaware Application January 24, 1948, Serial No. 4,097

3 Claims. (Cl. 181—.5)

The present invention is directed to improvements in a method of seismic exploration of subsurface strata of the earth. More particularly, the invention is directed to improvements in a method of generating seismic waves beneath large bodies of water.

In the art of seismic exploration on land, it is conventional to fire a shot or charge of explosive in a shot hole in the earth. The explosion of the charge produces waves which travel in all directions through the earth. A part of these waves may travel downward through various strata and be reflected from or refracted through certain subsurface strata and then be returned to the surface. It is conventional to arrange vibration detectors, commonly known as seismic pickups or geophones, at known distances from the shot hole and to convert a portion of the seismic energy transmitted through the earth to electrical energy which may be amplified and recorded upon a moving strip of film or paper by means of a suitable oscillograph. In order that useful calculations may be made from the record thus obtained, it is important that the record should be sharp, clear and free from extraneous disturbances.

When applying conventional seismic exploration methods, as used on dry land, to explore beneath extensive bodies of water, such as rivers, lakes, ocean bays and the like, the charge of explosive is generally not placed in a shot hole but is fired beneath the surface of the water and preferably close to the bottom thereof. It has been observed that when the charge of explosive is small or is fired at such depth in the water that the force of the explosion fails to blow out the water above the charge, spurious seismic impulses which are secondary to the primary waves normally produced by the explosion are often generated. These secondary impulses frequently are nearly as strong as the primary seismic waves but occur at a slightly later time than the primary waves. As a result, two or more events may appear upon the seismograph record and may lead to misinterpretation of the record.

It is believed that the secondary impulses produced when a charge of explosive is fired under water are the result of the dissipative oscillatory process of expansion, contraction, re-expansion and re-contraction of the "gas bubble" or cavity formed in the water by the combustion products of the exploding charge. In the prior art, it is known to prevent occurrences of secondary impulses by correlating the amount of explosive charge, the strength of the explosive and the depth at which the explosive is fired so that the explosive force is just sufficient to blow out the water above the exploding charge and thus permit the gas bubble to vent immediately into the air rather than oscillate through stages of expansion, contraction and re-expansion.

Although the method of the prior art may be satisfactory under certain circumstances when exploring in relatively shallow water, it has disadvantages particularly when exploring in relatively deep water. In order to utilize explosive material efficiency, it is desirable that the charge of explosive should be fired on or close to the bottom of the body of water or at least far enough below the surface of the water so that the force of the explosion is insufficient to blow out the water above the exploding charge and thereby confine the force of the explosion below the surface of the water so that as much as possible of the energy of the explosion may be converted into useful seismic waves. If it be known from experience, for example, that a certain size charge of explosive of a given strength is sufficient to produce a desired record, it may be found that this charge is insufficient to blow out the water thereabove when the charge is placed adjacent the bottom in relatively deep water. Therefore, in the practice of the prior art method an amount of explosive larger than is required to obtain the desired record may be needed to blow out the water and prevent generation of secondary seismic impulses.

I have now discovered a method for generating primary seismic waves which may be used economically and flexibly in either deep or relatively shallow water without generating secondary seismic impulses.

I have observed that any effect which tends to distort the normally spherical cavity or gas bubble formed in the water by an exploding charge is beneficial in suppressing the generation of secondary seismic impulses since the bubble does not then collapse toward a point near its center and the elastic energy thereof is dissipated or radiated uniformly. Briefly stated, the method of my invention comprises placing below the surface of the water a charge of explosive, and placing at an effective distance from the charge and below the surface of the water a mass having an acoustic impedance substantially different from that of water, and capable of withstanding disintegrating forces of the charge when fired and capable of distorting appreciably the normally spherical gas bubble or cavity formed in the water by the exploding charge.

Figure 2:
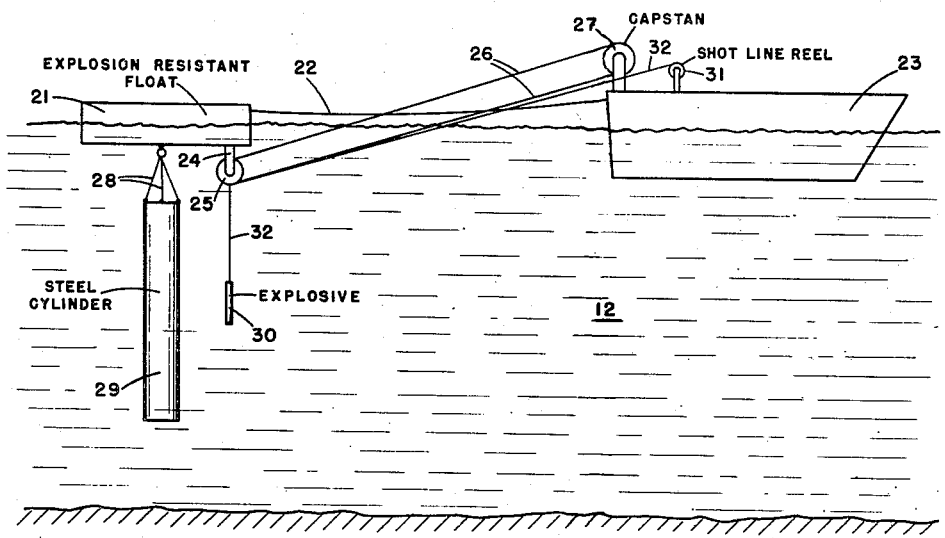

The method of my invention may be better understood from the following description when read in conjunction with the accompanying drawing in which Fig. 1 is a diagrammatic representation, partly in section, of one embodiment of apparatus suitable for use in practicing the method of my invention, and Fig. 2 is a sectional view diagrammatically representing another embodiment of apparatus also adapted for use in practicing the method of my invention.

Referring first to Fig. 1, the numeral 11 designates a suitable explosion resistant float which may be anchored at the surface of a body of water 12. A solid mass such as a steel plate 13 capable of withstanding disintegrating forces of a charge of high explosive is suspended by suitable cables 14 beneath the float. A charge of explosive 15 adapted to be fired and generate seismic waves in the earth is likewise suspended adjacent mass 13 by suitable means 16. Explosive charge 15 is provided with a shot line 17 whereby the explosive may be fired from a safe distance. In accordance with my invention, explosive charge 15 is arranged at an effective distance from mass 13 so that the normally spherical cavity or gas bubble formed in the water by the explosion of the charge will be distorted into a non-spherical shape by the mass 13. It will be apparent that, if the charge of explosive is placed against a flat steel plate, the plate will have considerable effect in distorting the cavity formed in the water. However, unless the plate is very strong, it might under these conditions be destroyed by the force of the explosion and would thereby be ineffective in distorting the major gas bubble formed as a result of the explosion. Accordingly, it is preferable to space the charge of explosive at an effective distance therefrom. An effective distance will obviously depend upon the size of the charge of explosive and its strength. In general, the mass 13 should be spaced from the charge of explosive 15 by a distance somewhat less than the maximum radius of the gas bubble normally formed by the particular quantity and strength of the explosive.

The above described embodiment illustrates the practice of the method of my invention at a single selected station over a water covered area. However, in practicing the specific aspects of the method it is desirable to select a plurality of shot point stations over the area where seismic waves are to be generated by firing charges of explosive and also to select a plurality of receiving or recording stations where seismic waves generated by the exploding charges are to be received and recorded after travelling through the earth. Although a particular recording station may become the next successive shot point station or vice versa, it is desirable that seismic waves produced at any given shot point station should be received at a recording station remote therefrom in accordance with known practice on dry land. It is then desirable to move from one selected shot point station to another while recording equipment is similarly moved from a selected recording station to another. A charge of explosive may thus be placed beneath the surface of the water at each successive shot point and a solid mass which will withstand disintegrating forces of the fired charge may be placed adjacent the charge to distort the bubble formed in the water when the charge is fired. While the embodiment of apparatus shown in Fig. 1 may be employed at a plurality of stations, the embodiment to be described in conjunction with Fig. 2 is preferred for mobility and convenience.

Referring now to Fig. 2, an explosion resistant float 21 is arranged on the surface of the water 12 and may be connected by a tow line 22 to a self-propelled boat or vessel 23. Float 21 may be provided on its underside with a bracket 24 and a pulley 25 over which may be run a continuous cable 26 which passes over a capstan 27 arranged on vessel 23. Suitably suspended beneath float 21 by means of a cable 28 is a cylindrical mass 29 which may conveniently be an appropriate length of large diameter steel pipe or steel rod. Cable 28 and mass 29 may be arranged on the underside of float 21 adjacent pulley 25 in such a manner that a charge of explosive 30 can be conveniently lowered beneath the surface of the water by means of continuous cable 26 and be brought into close proximity to mass 29. In order that explosive 30 may be fired at a remote distance from vessel 23, a reel 31 containing electrical cable adapted to fire explosive charge 30 in conventional manner is provided.

It will be evident that, in marine seismic exploration, vessel 23 may proceed from one selected station on the surface of water 12 to another station and by means of cable 22 can tow the float 21 to the selected shot point. At each successive station a charge of explosive may be suspended by means of insulated electrical conductors 32 from continuous cable 26 and then, by operating capstan 27, explosive charge 30 may be conveniently lowered beneath the surface of the water and brought into proximity with mass 29. At the desired moment the charge of explosive can then be fired by passing an electric current through conductors 32. Upon firing the charge of explosive 30, shock waves will be transmitted through the water and into the earth and these waves may be picked up, after travelling through the earth, by suitable seismic pickups (not shown) located in conventional manner at a remote distance from the shot point. As the charge of explosive is fired, a gas bubble or cavity will be created in the water immediately around the location of the explosive charge. In the absence of a distorting mass, such as mass 29, this cavity will normally assume a spherical shape and the forces of the explosion will cause the cavity to expand, contract, and re-expand, perhaps repeatedly, producing one or more secondary seismic impulses.

By firing the explosive charge 30 in close proximity to a solid mass 29, the shape of the gas bubble or cavity is distorted to a non-spherical shape and it has been observed that a cavity in water thus distorted does not collapse in a manner such as to produce spurious secondary seismic impulses.

As may be seen from Figs. 1 and 2, the explosive charges 15 and 30 are not confined by the solid masses 13 and 29. Similarly the forces produced by these charges are not substantially confined by masses 13 and 29 but are confined only by the water surrounding the charges. While these masses serve to distort the normally spherical shape of the gas bubbles formed in the water by the exploding charges, they do not materially confine the propagation of explosive energy in all directions. Accordingly, where used in the appended claims, the term "unconfined relationship" will be understood to refer to the energy-confining relationship of the solid masses 13 and 29 and not to the energy-confining relationship of the water in which the charges are fired.

The method of my invention may be further understood from the following example:

A one pound charge of explosive equivalent to about one pound of 60% dynamite was suspended approximately ten feet below the surface in the Gulf of Mexico at a place where the depth of the water was approximately 37 feet. When the charge was fired, the water above the exploding charge was not blown out and seismic waves were produced. These seismic waves were picked up by seismic pickups located at a remote distance from the shot point. The seismograph record, which was made in conventional manner, indicated that secondary seismic impulses as well as primary seismic waves were produced as a result of firing the explosive charge.

Tests were then conducted employing apparatus substantially in the form illustrated in Fig. 1 in which body 13 was a one-half inch thick steel plate about six feet square arranged in a generally horizontal position about ten feet below the surface of the water. A one pound charge of the same kind of explosive mentioned above was suspended approximately four feet below the center of the steel plate. When this charge was fired, the seismograph record that was made in conjunction therewith also showed the presence of objectionable secondary impulses.

The test was repeated with the exception that the charge of explosive was spaced approximately two feet below the steel plate. Although the seismograph record obtained in this test showed the presence of secondary impulses, the magnitude of these impulses was approximately one-half that obtained in the absence of the steel plate.

Six additional tests were conducted in each of which a one pound charge of explosive was suspended about six inches below the steel plate described above. During each of these six tests seismograph records obtained in conventional manner showed that, although normal primary seismic waves were received, no secondary seismic disturbances were received by the seismic pickups.

Subsequent examination of the steel plate revealed that it had been bowed upward by the force of the several explosions but that it had not been disintegrated.

It may be seen from the above tests that, as the successive one pound charges of explosive were placed closer and closer to the steel plate, they were eventually placed and fired at a distance effective to prevent the generation of secondary seismic impulses.

While I have described and illustrated the practice of the method of my invention with reference to a steel body spaced adjacent the charge of explosive, it is within the scope of my invention to employ other solid bodies spaced an effective distance from the charge so long as the body is not excessively deformed or disintegrated by the forces of the explosion and thereby made ineffective in distorting the cavity or major gas bubble formed by the exploding charge. Thus, heavy timbers, suitably anchored below the surface of the water, large rocks or reinforced masonry bodies having either smooth or irregular shapes may be employed. If desired, a plurality of bodies may be spaced an effective distance around the explosive charge.

In the practice of my invention, it is important to select a solid body which is not in itself readily distorted by the force of the exploding charge to conform with the shape of the normally spherical cavity formed thereby since a body deformed in this manner will generally be ineffective in preventing generation of secondary seismic impulses.

Having fully described and illustrated the method of my invention, what I wish to claim as novel and to secure by Letters Patent is:

1. In a method for seismic exploration wherein a charge of explosive is fired beneath the surface of an extensive body of water, the method of preventing generation of secondary seismic impulses while generating primary seismic waves which comprises placing a charge of explosive beneath the surface of the water, placing beneath the surface of the water a mass capable of withstanding disintegrating forces of the charge when fired, spacing said charge from said mass in unconfined relationship at a distance effective to distort the normally spherical cavity formed in the water when the charge is fired, and firing the charge of explosive to generate seismic waves.

2. In a method for seismic exploration wherein a charge of explosive is fired beneath the surface of an extensive body of water, the method of preventing generation of secondary seismic impulses while generating primary seismic waves which comprises placing a charge of explosive beneath the surface of the water, placing beneath the surface of the water a solid body capable of withstanding disintegrating forces of the charge when fired, spacing said charge from said body in unconfined relationship at a distance not exceeding the maximum radius of the cavity formed in the water by the charge when fired, and firing the charge of explosive to generate seismic waves.

3. In a method for seismic exploration wherein charges of explosive are fired at a plurality of selected shot point stations beneath the surface of an extensive body of water to produce seismic waves and said seismic waves are recorded at a plurality of selected recording stations, the improvement which comprises successively placing beneath the surface of the water at each shot point station a charge of explosive, placing beneath the surface of the water at each said station a solid mass capable of withstanding disintegrating forces of the charge when fired, spacing said charge in unconfined relationship at a distance from said mass effective to distort the normally spherical cavity formed in the water when the charge is fired, firing said charge to produce seismic waves, and recording seismic waves at a selected recording station remote from said shot point station.

RALPH W. MANN.

REFERENCES CITED

The following references are of record in the file of this patent:

UNITED STATES PATENTS

| Number | Name | Date |
|---|---|---|
| 16,473 | Eads | Jan. 27, 1857 |
| 1,867,098 | Rieber | July 12, 1932 |
| 2,203,140 | Green | June 4, 1940 |
| 2,283,200 | Flude | May 19, 1942 |